July 20, 1965 W. F. HAMILTON 3,195,402
LIGHT SPOT PROJECTION APPARATUS
Filed April 18, 1963
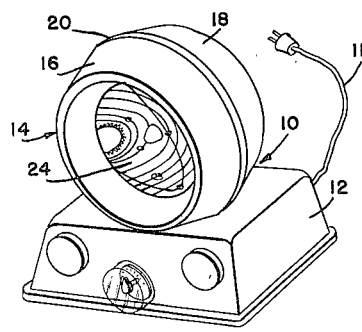
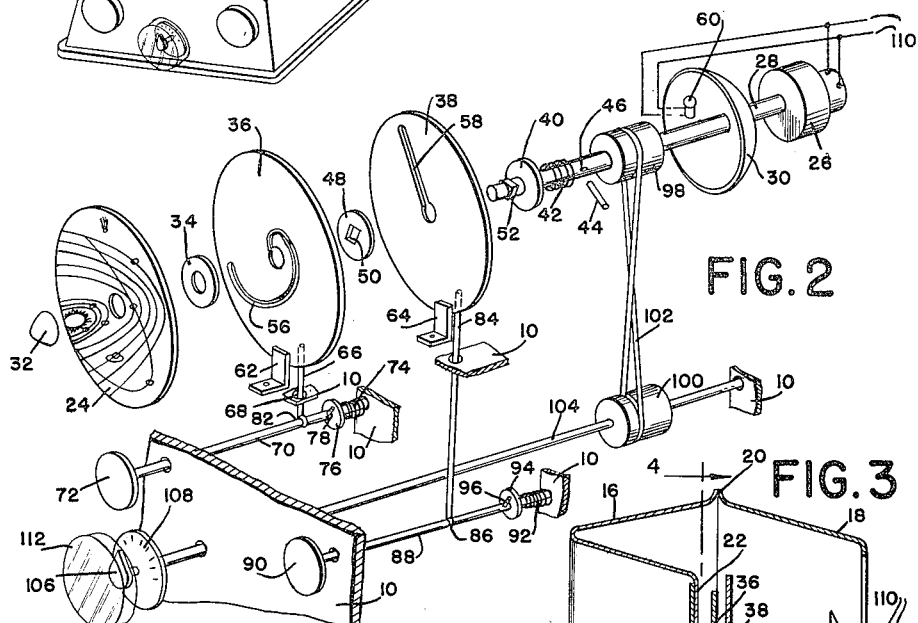
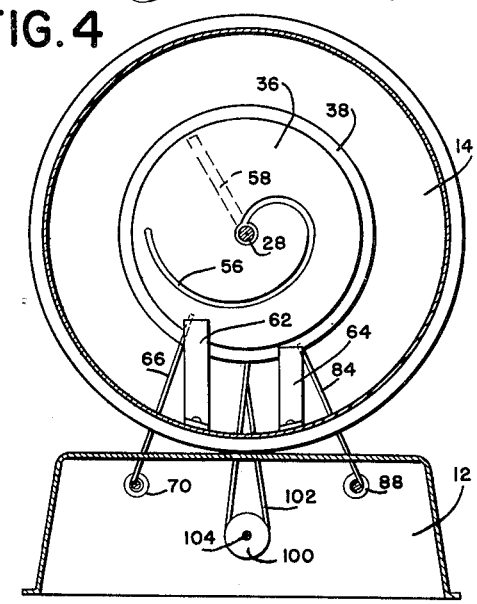
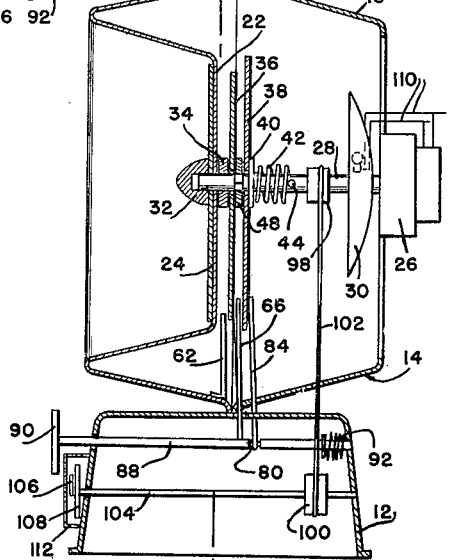
INVENTOR.
WILLIAM F. HAMILTON
BY
*Raymond W Coolten*
ATTORNEY

3,195,402
LIGHT SPOT PROJECTION APPARATUS
William F. Hamilton, 116 N. Furman St., Alexandria, Va.
Filed Apr. 18, 1963, Ser. No. 273,997
5 Claims. (Cl. 88—24)

This invention relates to projection apparatus which is useful as an educational device, a game, and for testing the skill and coordination of an operator.

It is among the objects of the present invention to provide projection apparatus comprising a frame carrying a diffusing screen, a light source for illuminating the screen, and a plurality of light controlling elements individually movably mounted between the screen and the light source, the elements containing light transmitting slits or windows of dissimilar configuration, relative movement of the elements producing registry of different portions of the slits or windows so as to determine the position of a spot of light on the screen.

The apparatus preferably includes a motor carried by the frame in driving relationship with at least one of the elements and means for restraining movement of that element. The motor is preferably in driving relationship with a plurality of the elements and together with means for restraining movement of any or all of these elements. An elapsed time indicator driven by the motor is also preferably provided.

In accordance with a preferred form of the invention, the elements are filters having similar optical characteristics and contain radial and spiral slits respectively. A pictorial representation, such as a representation of a portion of the universe, may be portrayed on the screen in the form of a drawing or printed material, or by projection.

A more complete understanding of the invention will follow from a detailed description of the accompanying drawings wherein:

FIG. 1 is a perspective view depicting the invention;

FIG. 2 is a diagrammatic and exploded perspective representation, not to scale, showing the major components of a preferred form of the invention;

FIG. 3 is a sectional elevation of the apparatus depicted in FIG. 1; and

FIG. 4 is a sectional elevation taken along line 4—4 of FIG. 3.

The frame 10 comprises a base or lower housing 12 and an upper housing 14 having a forward member 16 and a rearward member 18 secured together to form a medial joint 20. The upper and lower housings are secured together in a suitable fashion, adhesively or otherwise, in a manner not depicted in detail. The forward member 16 of the upper housing provides a closed radial wall 22 on which a diffusing screen 24 is applied, shown in FIGS. 1 and 2 as portraying a portion of the universe. It will be understood of course, that such a pictorial representation can be applied directly on the radial wall 22 so long as a diffusing effect is produced. The rearward portion 18 of the upper housing suitably supports an electric motor 26 driving a shaft 28 which extends through a reflector 30, the radial wall 22 and the screen 24 into a journal element 32 which is adhesively or otherwise suitably secured to the screen 24 or the radial wall 22.

Intermediate the journal element 32 and the motor 26, the shaft 28 loosely receives a washer 34, a disc 36, a disc 38, a washer 40, and a helical spring 42. A pin 44 is received through a radial opening 46 in the shaft 28 to serve as an abutment for the spring 42. Another washer 48, received between the discs 36 and 38 on the shaft 28 is suitably keyed to the shaft so as to rotate with it. The keying action may be effected by providing the washer 48 with a non-circular opening 50 complementing a non-circular portion 52 formed on the shaft 28.

The discs 36 and 38 are shown as containing spiral and radial slits 56 and 58 respectively whose points of intersection will determine the position of a spot of light on the screen 24 produced by a light source 60 suitably supported between the reflector 30 and the screen 24. The frame 10 supports an abutment 62 for cooperation with the disc 36 and an abutment 64 for cooperation with the disc 38. On the side of the disc opposite the abutment 62 a braking element 66 is provided, extending through an opening 68 in the frame 10 about which it can pivot when its actuating push rod 70 is depressed by operation of a knob 72 against the force of a spring 74 disposed between a portion of the frame 10 and a washer 76 whose movement along the push rod 70 is restrained by a pin 78 extending through the push rod. The push rod is provided with an intermediate reduced portion 80 about which the lower end of the braking element 66 is bent to form a loosely engaging loop 82.

In a similar fashion, a braking element 84 lies on the opposite side of the disc 38 from the abutment 64 and has a loop 86 at its lower end loosely engaging a reduced portion of the push rod 88 to which a reciprocating movement is imparted by depression of its knob 90 against the force of a spring having one end bearing upon a portion of the frame 10 and its other end against a washer 94 whose position along the push rod is limited by a pin 96 extending into a radial opening formed in the push rod.

Intermediate the spring 42 and the reflector 30, the shaft 28 carries a pulley 98 which drives another pulley 100 by means of a crossed belt 102. The pulley 100 is secured to a shaft 104 journaled in spaced portions of the frame 10 and carrying at its forward end a needle 106 to indicate with respect to a dial 108 the elapsed time for a particular manipulation of the apparatus.

In the form of the invention depicted in the drawings, the braking elements 66 and 84 do not restrain the discs 36 and 38 respectively, unless the respective knobs 72 and 90 are depressed. Accordingly, until there is a depression of one or the other of these knobs, the discs 36 and 38 will rotate with the shaft 28. When the knob 72 is depressed sufficiently, its braking element 66 will press the disc 36, which may be composed of a flexible plastic material, against the abutment 62 whereupon the washer 48 will rotate without rotating the disc 36. Similarly, when the braking element 84 is applied against its disc 38 to press it into contact with the abutment 64, it will likewise be restrained against movement. When these knobs 72 and 90 are released, rotation of the discs will be resumed under the force applied by the spring 42. It will follow that the position of a spot of light on the screen 24 will be determined by the point of intersection of the slits 56 and 58. By restraining one of these discs, the spot of light will appear to move spirally in a path conforming to the slit 56. When the other disc has its movement restrained, the spot of light will appear to move radially on the screen.

Assuming that the journal member 32 represents the position of the earth, a problem can be established in the form of a contest to determine which of several competitors can provide an orbit for the spot of light so as to move it from the earth to one of the planets in a minimum length of time. The discs can be manipulated by means of the knobs 72 and 90, with the motor 26 and light source 60 energized through the conductors 110 until the spot of light assumes a position touching the journal element 32 representing the earth. Then, at a particular time indicated by the needle 106 on the calibrated dial 108, one of the contestants can manipulate the knobs 72 and 90 to cause the light spot to move to the desired planet on the pictorial representation and when the spot of light intersects the prescribed destination, another reading can be taken of the position of the needle 106. Then another contestant will perform the same type of manipulation and the time requirements of the competitors compared to determine which has been more adroit.

The needle 106 has been shown as provided with a transparent cover 112 to protect it against damage.

It will be understood that a variety of pictorial representations can be used and the problems to be solved can be diversified to include a wide range of recreational and educational subjects.

Whereas only one form of the invention has been described with respect to the accompanying drawings, the invention should not be limited thereto since various modifications will be included within the scope of the appended claims.

I claim:

1. Projection apparatus comprising a frame carrying a diffusing screen bearing a pictorial representation, a light source for illuminating said screen, a plurality of light controlling elements independently movably mounted between said screen and light source, a motor carried by said frame in driving relationship with one of said elements and means for restraining movement of said one element, said elements containing light transmitting slits of dissimilar configuration, relative movement of said elements producing registry of different portions of said slits whereby light from said source will produce a spot of light on said screen movable relative to said pictorial representation.

2. Projection apparatus according to claim 1 including means for restraining movement of each of said elements.

3. Projection apparatus comprising a frame carrying a diffusing screen, a light source for illuminating said screen, a plurality of light controlling elements individually movably mounted between said screen and light source, said elements containing light transmitting slits of dissimilar configuration, relative movement of said elements producing registry of different portions of said slits, a motor carried by said frame in driving relationship with said elements, means for individually restraining said elements, and an elapsed time indicator driven by said motor.

4. Projection apparatus according to claim 1 wherein said elements are similar light filters.

5. Projection apparatus according to claim 1 wherein said elements contain radial and spiral slits respectively.

References Cited by the Examiner

UNITED STATES PATENTS

| | | | |
|---|---|---|---|
| 2,267,961 | 12/41 | Tillyer et al. | 88—140 |
| 2,651,115 | 9/53 | Davies | 88—24 X |
| 2,935,316 | 5/60 | Bradstreet | 40—106.52 X |

NORTON ANSHER, *Primary Examiner.*

WILLIAM MISIEK, *Examiner.*

UNITED STATES PATENT OFFICE
CERTIFICATE OF CORRECTION

Patent No. 3,195,402                                     July 20, 1965

William F. Hamilton

It is hereby certified that error appears in the above numbered patent requiring correction and that the said Letters Patent should read as corrected below.

Column 2, line 26, after "spring" insert -- 92 --.

Signed and sealed this 18th day of January 1966.

(SEAL)
Attest

ERNEST W. SWIDER                                    EDWARD J. BRENNER
Attesting Officer                                        Commissioner of Patents